(12) United States Patent
Lantrip

(10) Patent No.: US 7,114,896 B2
(45) Date of Patent: Oct. 3, 2006

(54) TIE DOWN APPARATUS AND METHOD OF USE

(76) Inventor: F. Terry Lantrip, 1618 Steinbeck Dr., Roseville, CA (US) 95747

( * ) Notice: Subject to any disclaimer, the term of this patent is extended or adjusted under 35 U.S.C. 154(b) by 0 days.

(21) Appl. No.: 11/260,371

(22) Filed: Oct. 28, 2005

(65) Prior Publication Data

US 2006/0045645 A1    Mar. 2, 2006

Related U.S. Application Data

(63) Continuation of application No. 10/964,716, filed on Oct. 15, 2004, now Pat. No. 6,981,826.

(60) Provisional application No. 60/530,342, filed on Dec. 18, 2003.

(51) Int. Cl.
*B60P 3/073*    (2006.01)

(52) U.S. Cl. .......................................... 410/7

(58) Field of Classification Search ............... 410/3–4, 410/7–11, 16, 13, 21, 23, 30–32, 42–43, 101, 410/104, 121, 122, 143–145, 152; 224/400, 224/402–405
See application file for complete search history.

(56) References Cited

U.S. PATENT DOCUMENTS

| | | | | |
|---|---|---|---|---|
| 3,713,616 A * | 1/1973 | Bowers | ........................ | 410/105 |
| 3,784,248 A * | 1/1974 | Neuman | ........................ | 296/157 |
| 3,799,070 A * | 3/1974 | Munson | ........................ | 410/149 |
| 4,316,544 A * | 2/1982 | Goldstein | ........................ | 211/5 |
| 4,650,383 A | 3/1987 | Hoff | | |
| 4,850,769 A * | 7/1989 | Matthews | ........................ | 410/105 |
| 4,969,784 A * | 11/1990 | Yanke | ........................ | 410/104 |
| 5,092,504 A | 3/1992 | Hannes et al. | | |
| 5,127,564 A | 7/1992 | Romero | | |
| 5,560,576 A | 10/1996 | Cargill | | |
| 5,611,472 A | 3/1997 | Miller | | |
| 5,702,007 A * | 12/1997 | Fritz et al. | ........................ | 211/17 |
| 6,179,181 B1 | 1/2001 | Johnson et al. | | |
| 6,270,301 B1 | 8/2001 | Dunlop | | |
| D460,039 S | 7/2002 | Smith | | |
| 6,679,408 B1 | 1/2004 | Thomas | | |
| 6,682,292 B1 * | 1/2004 | Estes | ........................ | 414/462 |
| 6,698,994 B1 * | 3/2004 | Barrett | ........................ | 414/462 |
| 6,722,726 B1 | 4/2004 | Parmer | | |
| 6,732,984 B1 | 5/2004 | Tsai | | |
| 6,834,786 B1 | 12/2004 | Hansen | | |
| 6,866,454 B1 | 3/2005 | White | | |
| 2003/0082034 A1 * | 5/2003 | Barrett | ........................ | 414/462 |
| 2003/0123964 A1 * | 7/2003 | Estes | ........................ | 414/462 |
| 2004/0262347 A1 * | 12/2004 | Green | ........................ | 224/403 |
| 2005/0017470 A1 * | 1/2005 | Abbott | ........................ | 280/79.4 |

* cited by examiner

*Primary Examiner*—H Gutman
(74) *Attorney, Agent, or Firm*—Clark & Brody

(57) ABSTRACT

A tie down apparatus for a carrier having a storage compartment to carry a recreational vehicle comprises a cross bar, ends of the cross bar being supported by upstanding legs. The cross bar has one or more members extending therefrom that create a space to receive a portion of the recreational vehicle. One or more eyelets are mounted to the cross bar in association with one or more of the space-creating members. Each eyelet serves as an attachment point for a chain, rope, belt or the like to further secure the recreational vehicle in place on the trailer.

14 Claims, 3 Drawing Sheets

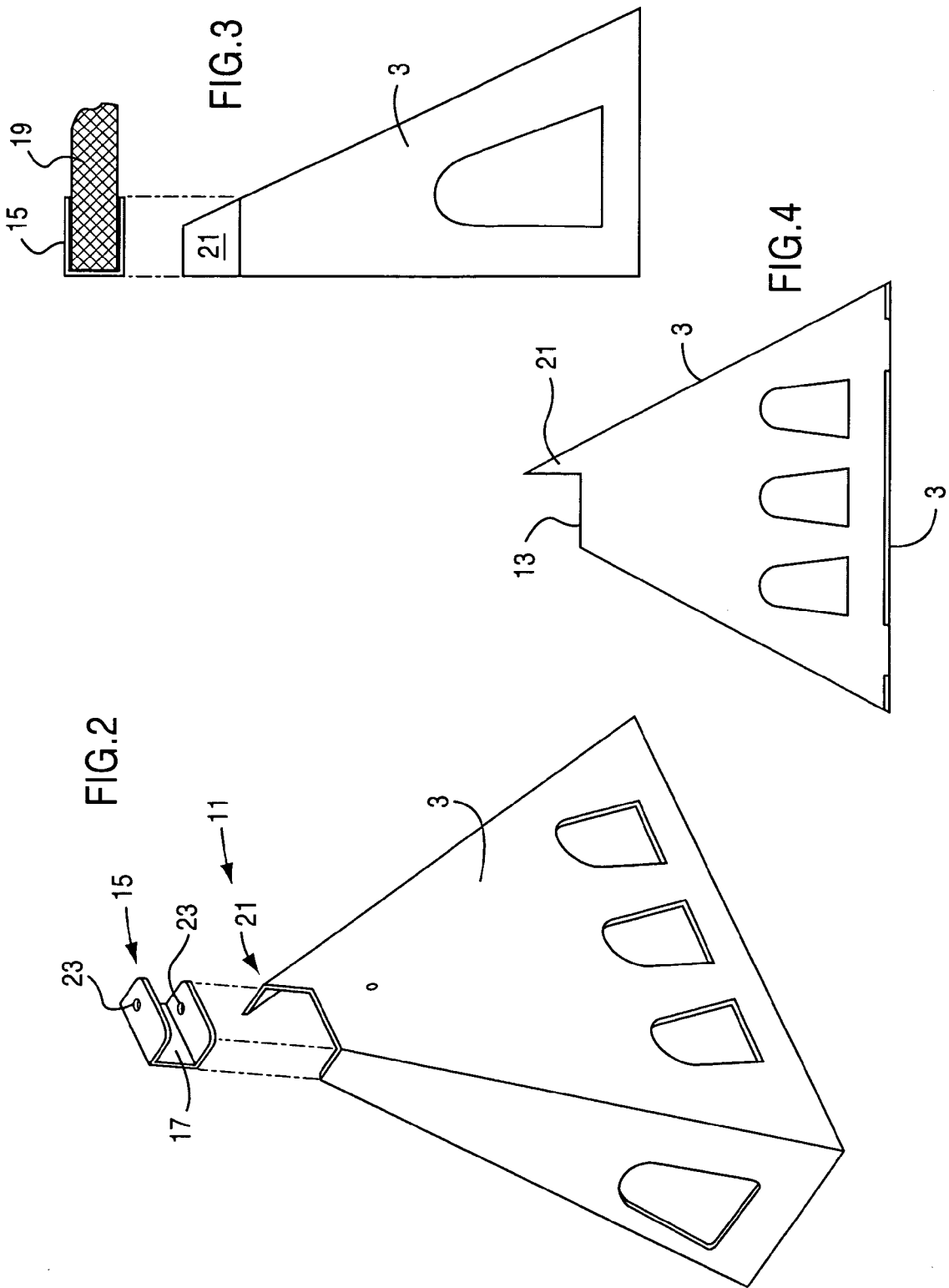

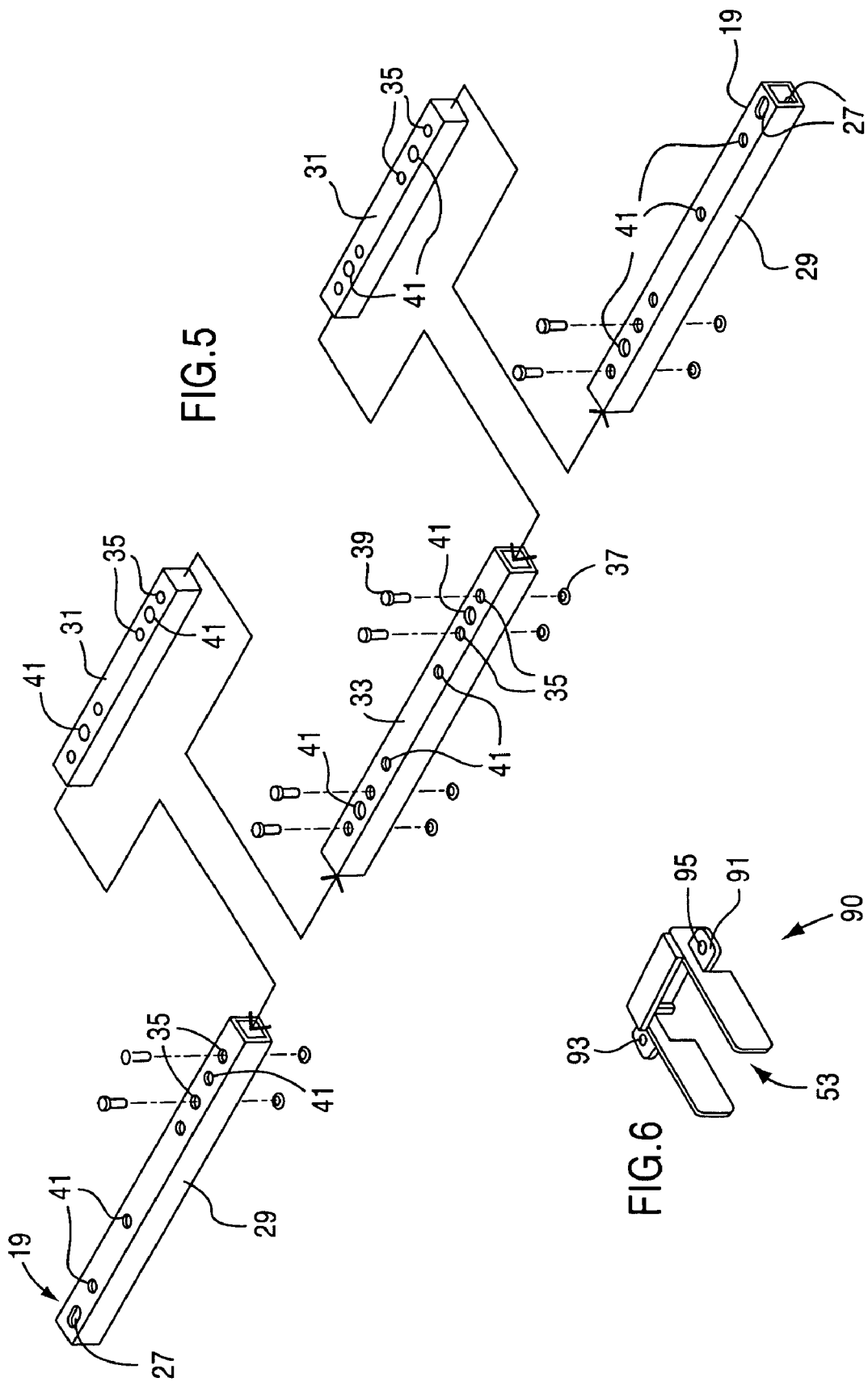

TIE DOWN APPARATUS AND METHOD OF USE

CROSS-REFERENCE TO RELATED APPLICATIONS

This application is a Continuation of U.S. patent application Ser. No. 10/964,716 filed Oct. 15, 2004, which claims priority of U.S. Provisional Patent Application No. 60/530,342 filed Dec. 18, 2003, now U.S. Pat. No. 6,981,826.

FIELD OF THE INVENTION

This invention relates to securing motorcycles, quads, bicycles and other recreational or industrial items (hereinafter referred to as toys or trailers for toys or recreational vehicles) inside or on a carrier. The invention can be used to significantly improve load capacity, load efficiency and load weight distribution.

BACKGROUND ART

It is known in the prior art to secure motorcycles, quads, bicycles, snowmobiles, dune buggies or other similar type toys into the bed of a pick-up truck or a u-haul type trailer. Typically, these restraining devices utilize the front or side walls of the carrier or trailer in conjunction with straps, rope, chain or other similar items that connect with some form of a hook, latch, bar or ring to tie-down these toys for travel. The toy itself may be tied down or a trailer supporting the toy, e.g., a wave runner trailer may be tied down.

Present day trailer industry manufacturers build many different models and styles of trailers like enclosed cargo, utility and recreational travel trailers sometimes referred to as "toy haulers" or "sport trailers". Many of these trailers provide a rear or front ramp that drops down for loading and unloading of the toys inside the trailer. This adds additional weight and the distribution of this added weight to these types of trailers is an issue noted in the trailer manufacturers' "owners manual" as guidelines for the consumer. One example of a toy hauler is shown in U.S. Pat. No. 6,722,726 to Parmer, herein incorporated in its entirety by reference.

To restrain the toys found in the trailers, the prior art employs a variety of rings extending across metal recessed cups, which are usually flush mounted in the floor of the trailer. The rings interface with the free end of a strap, rope, chain or other similar type matter for securement purposes.

Another device employs a floor-mounted receiver that utilizes an aperture designed to receive the front or rear wheel of the toy that it is intended to secure, with the toy sliding into place.

Yet another prior art device employs a plunger, which, when aligned with an aperture in the track, permits the toys to be latched and held at that particular place.

The prior art devices discussed above are not without their problems though. Devices utilizing rings as the tie down or anchor that are mounted in the floor at fixed locations leave little flexibility to adjust for multiple toys to be secured. The angles sometimes needed to secure multiple toys require multiple rings for security and are only as good as the holding power of the straps, rope, chain or other like matter. Also, rings or ring-like devices do not create a front or rear tire stopping point or wall from which the wheels can be independently secured.

While the prior art floor mounted track may be adequate for multiple adjustments, it does not create a front or rear tire stopping point or wall from which the wheels can be independently secured. The track must also be maintained to remain free from sand, gravel and excessive dirt or rocks that may impede its ability to allow apertures that attach to the track to slide free for adequate adjustment.

Still another problem exists with conventional tie down or anchor devices or methods, which rely solely on straps, ropes, chains or other similar methods of securing the toys. These methods and devices have a tendency to loosen with excessive movement of the transporting vehicle. That is, the secured toys are held down by a strap or similar item and in part by the tension in the suspension of the secured toys themselves. Without a secondary position locking method and/or device in place, a loosened strap allows the toy to move freely about the towing vehicle and come into damaging contact with other toys or trailer/carrier components.

Therefore, a need exists for a novel arrangement that overcomes the deficiencies in the prior art discussed above. The present invention responds to this need by providing a secondary source of securing the toys for travel, as well as an integrated device that spreads the weight across a large amount of the trailer floor space to more adequately position the load for travel.

SUMMARY OF THE INVENTION

Therefore, it is a first object of the invention to provide an improved tie down apparatus for restraining toys, their carriers, or recreational vehicles during transport. More specifically, this invention relates to securing the above listed toys for travel "in" or "on" different types of utility, cargo or travel trailers or vehicles (hereinafter referred to as a carrier).

Another object of the invention is a tie down apparatus that uses a securing means to restrain lateral movement, forward or backward movement, and allow for the use of flexible elongate members for securement.

A further object of the invention is the combination of a tie down apparatus and a carrier for a toy or a toy carrier.

The problems and difficulties noted above are alleviated by the present invention, which provides a novel tie down or anchoring means and a secondary source of securing the toys independently to a crossbar as a stopping point for forward, backward or side-to-side movement, and to secure toys for travel in or on the towing vehicle or carrier.

In satisfaction of the foregoing objects and advantages, the present invention provides a tie down apparatus for securing one or more recreational vehicles in a storage compartment of a carrier comprising a cross bar and a pair of support legs. Each support leg is adapted to attach to the storage compartment, with a portion of each support leg further adapted to support one end of the cross bar above a floor of the storage compartment.

At least one securing member is provided, each securing member being mounted to the cross bar and shaped or configured to extend therefrom. The attachment of the one or more securing members to the cross bar creates a space to receive a portion of the recreational vehicle. One or more eyelets or other aperture-containing structures are mounted to or made part of the cross bar, with at least one of the eyelets associated with each pair of members. Each member of the pair can have a corresponding eyelet if desired, and attachment of the eyelet to the cross bar can also secure the respective member to the cross bar. The members and/or eyelets can be adjusted along the length of the cross bar to accommodate differently sized recreational vehicles.

The cross bar can be removably attachable to the support legs, and can be made in sections to allow for adjustment in width. A number of the securing members, each also being removably attached to the cross bar, can be utilized to permit securement of more than one vehicle.

Each support leg can employ a bracket with a slot sized to receive an end of the cross bar for cross bar mounting. The support leg can also employ a raised portion positioned at an end of the bracket to prevent cross bar travel after slot engagement.

The invention also entails the combination of the tie down apparatus and a storage compartment of a carrier. The carrier can be a vehicle, a trailer, or virtually anything with a compartment that can receive a recreational vehicle or vehicle carrier for transport.

The invention is also an improvement in methods of hauling one or more recreational vehicles using a carrier having a storage compartment through the use of the inventive tie down apparatus.

In one preferred embodiment, the invention utilizes floor mounted legs and a crossbar system that fastens to the legs to create a place inside these types of trailers to secure the toys for travel. Utilizing opposite sides of the crossbar for securing the items independently spreads the distribution of weight, organizes the toys for higher capacity, creates an easy loading method, and helps the consumer comply with the manufacturer's recommendations. The crossbar also creates an additional forward or rear abutment that acts as a stopping point or wall that does not allowing the toys or recreational vehicles to move from that position once they are secured.

BRIEF DESCRIPTION OF THE DRAWINGS

Reference is now made to the drawings accompanying the invention wherein:

FIG. 2 is a perspective view of one of the support legs of the tie down apparatus;

FIG. 3 is one side view of the support leg of FIG. 2;

FIG. 4 is another side view of the support leg taken 90 degrees from the view of FIG. 3;

FIG. 5 is a perspective view of the cross bar of FIG. 1 in an exploded view; and FIG. 6 is a perspective view of an alternative securing member of the tie down apparatus.

DESCRIPTION OF THE PREFERRED EMBODIMENTS

Figure 1:
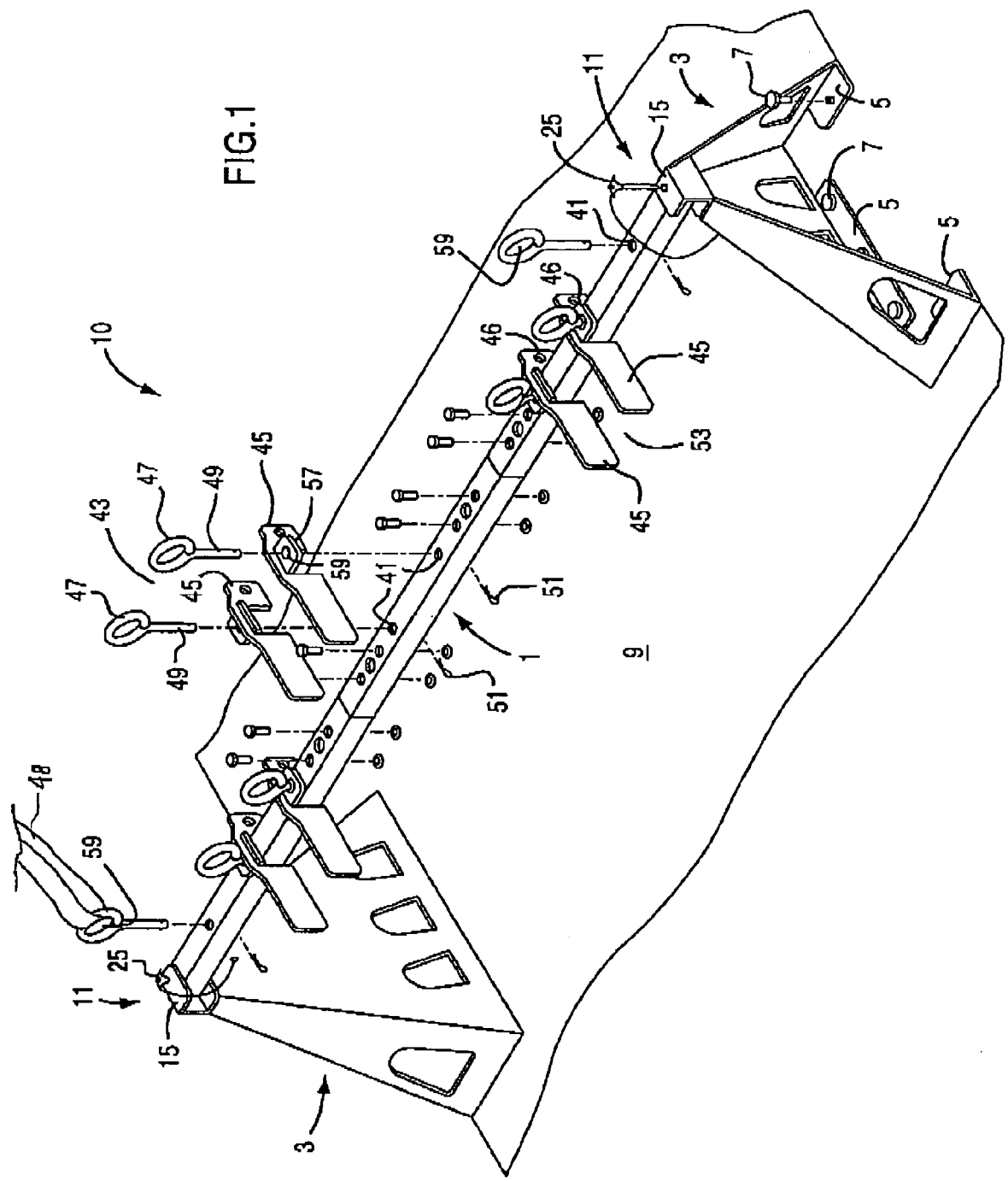
FIG. 1 is a perspective view of one embodiment of the inventive tie down apparatus with one part in exploded view.

The invention is a tie down apparatus that allows one or more toys or recreational vehicles to be secured for travel in or on a trailer or carrier. Recreational vehicles or toys are also considered to encompass a carrier of a toy or vehicle such as a wave runner trailer. In this mode, the trailer wheel could be restrained by the tie down apparatus rather than the wave runner itself. In one embodiment, the tie down apparatus comprises two floor mounted legs that rise in a pyramid-like shape to a housing or cradle used to receive the crossbar. The legs are secured to the floor with carriage bolts, locking nuts and washers. The crossbar slides into the cradle of the legs and utilizes a push/pull locking pin to secure the crossbar to the legs. Holes are positioned in the crossbar for assembly of two splice bars and to allow apertures used to secure the front or rear wheel of the toy, to be positioned and locked to the crossbar for adjustment to secure one or more toys. The toy is then independently secured by hand with a strap, rope, chain, belt or other matter so as to connect the toy to eyelets or apertures associated with the crossbar, which can be easily moved for adaptable positions.

Referring to FIG. 1, the tie down apparatus, in one mode of the invention is designated by the reference numeral 10 and is seen to include a cross bar 1 and a pair of upstanding support legs 3.

The legs 3 are pyramidal in shape and have base flanges 5 adapted to be mounted to the floor of a trailer using conventional fasteners 7. While the legs 3 are shown as pyramidal, the legs could have other shapes and could be attached to other parts of the trailers, e.g., a sidewall or the like. Likewise, other base configurations could be used. The legs 3 raise the cross bar 1 from the floor 9 of the trailer to provide a stop against movement of the recreational vehicles when being transported by the trailer, as well as providing rigidity and stability to the cross bar 1 to secure the recreational vehicles.

Referring to FIGS. 2–4, the legs 3 also have supporting means designated as 11 for securing the cross bar 1 at an upper end portion 13 thereof. The securing means 11 includes a bracket 15 that is fixed at the upper end 13, preferably by welding. The bracket 15 forms a slot 17, which is sized to receive the cross bar end 19 in a sliding engagement, see FIG. 3. The upper end 13 includes a raised portion 21, see FIG. 4, which functions as another stop to prevent travel of the cross bar end 19 when inserted into the bracket 15. Each bracket 15 has a pair of aligned through holes 23, which receive a tethered pin 25 for attachment of the cross bar 1 to the legs 3.

Referring to FIG. 5, the cross bar 1 has aligned through holes 27 on each end 19, each through hole 27 intended to align with the through holes 23 in the brackets 9 for securement. The tethered pin 25 extends through each pair of through holes. It should be understood that other modes of attachment to secure the cross bar 1 to each of the legs 3 can be employed, e.g., a fixed attachment such a welding, or other removable attachment modes such as clamps, nuts and bolts, or the like.

The cross bar 1 can be one piece but is preferably made in a number of pieces or side bars to allow for adjustment in its length and accommodate different size trailers, and different spacings for the securing means. In FIG. 5, one embodiment is shown wherein five segments are employed, two sides bars 29, two splice bars 31, and a center bar 33. The splice bars 31 are sized to telescope within the center bar 33 and side bars 29. Each of the bars 31 and 33 are equipped with through holes 35 on each end with the side bars 29 having the holes 35 on just one end. The holes of one bar are designed to align with the holes of an adjacent bar for attachment purposes using the nut 37 and bolt 39 fasteners. The various bars could be made in different lengths and with appropriate positioned openings so that a desired carrier width can be matched by the right combination of bars.

Referring again to FIG. 1, the cross bar is also equipped with a second set of through holes 41 that are designed to work with the securing means 43 mounted to the cross bar. The securing means in this mode comprises a pair of plates 45, each plate equipped with a corresponding eyelet 47. Each eyelet end 49 is sized to pass through the holes 41 and be secured using a pin 51. Each plate 45 is shaped to extend generally perpendicularly from the cross bar, with the pair of plates 45 creating a space 53 to receive a portion of a recreational vehicle such as a wheel or tire. Each plate 45 can also be equipped with a flange 57 having an opening 59 adapted to receive the eyelet end 49 so that the eyelet 47 also secures the plate 45 to the cross bar. While a pair of plates are employed, a single unshaped member or other shaped member could be mounted to the cross bar with one or more eyelets for securement purposes, the single securing member creating the space 53 as is done with the pair of plates 45. FIG. 6 shows such a member 90 creating the space 53, with flanges 91 and openings 93 for cross bar attachment.

As seen in FIG. 1, the eyelets 47 can be used alone or in combination with the plates 45, with the eyelet opening 59 allowing for attachment of a flexible elongate member such as a chain, belt, strap or the like for securing the recreational vehicle to the cross bar. The plates 45 also have additional openings 46 for securement purposes. It should also be understood that the plates 45 and eyelets 47 could be attached separately from each other, and other modes of attachment of the plates and/or eyelets could be employed. The through holes 41 can be positioned in a variety of locations on the various cross bar pieces to allow for adjustability of the placement of the plates 45 and eyelets 47 to accommodate different types of recreational vehicles. Using the eyelet 47 to secure the plates 45 to the cross bar 1 is more efficient since it eliminates the need to have a separate fastening system for the plates 45. It should also be noted that the splice bars 31 are also equipped with through holes 41 to allow the eyelet ends 49 to pass through the telescoped junction of the splice bars 31 and side and center bars 29 and 33. Finally, while a pair of eyelets 47 are shown in combination with the plates 45, a single eyelet 47 could be used as well. Moreover, the term eyelet is intended to include any structure that provides an opening or other aperture allowing for securement of the recreational vehicle using an elongate member such as a chain, strap, rope or the like. FIG. 1 also shows a set of plates 45 positioned opposite other set of plates 45 and a flexible member 48 for lateral securement in one of the eyelets 47.

In use, the legs 3 would be mounted to the floor 9 of a trailer, and the cross bar 1, after assembly, would be attached to the brackets 15 using the pins 25. The securing means 43 could then be mounted to the appropriate locations on the cross bar 1, and one or more recreational vehicles could then be mounted by positioning a portion of the vehicle(s) in one or more of the spaces 53, and further securing the vehicles with tensioned straps or the like between the eyelets 47 and the vehicles. If a one piece bar is employed, the securing means 43 could be attached to the cross bar prior to attachment of the bar to the supporting legs. With the portion of the recreational vehicle confined in the space 53 created by the pair of plates 45, lateral movement of that vehicle portion and the vehicle itself is restrained, thus increasing the stability of the recreational vehicle and its trailer during its transport. As noted above, since the cross bar 1 is elevated from the trailer floor 9, it also acts as a stop against movement of the recreational vehicle in the direction towards the cross bar.

While plates are depicted as the shape for creating the space 53, virtually any type of a member that could be mounted to the cross bar and extend therefrom can be used, e.g., rods, pipes, or the like.

While the tie down apparatus is exemplified for use in a trailer, it can be employed in any type of a carrier, vehicle, trailer or the like having a storage compartment, whether it be a trailer compartment, the bed of an open or closed truck, a van, or the like.

As such, an invention has been disclosed in terms of preferred embodiments thereof, which fulfills each and every one of the objects of the present invention as set forth above and provides new and improved tie down apparatus and method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A tie down apparatus for securing one or more recreational vehicles in a storage compartment of a carrier comprising:
 a) a cross bar;
 b) a pair of support legs, each support leg adapted to attach to the storage compartment; with a portion of each support leg adapted to support one end of the cross bar above a floor of the storage compartment;
 c) at least one pair of members, each member being mounted to the cross bar and shaped to extend therefrom, the attachment of the pair of members to the cross bar creating a space to receive a portion of the recreational vehicle, and
 d) at least one structure associated with the cross bar to facilitate lateral restraining of the recreational vehicle, wherein the cross bar is removably attachable to the support legs.

2. The apparatus of claim 1, wherein each member of the pair has an eyelet as the structure, attachment of the eyelet to the cross bar also securing the member to the cross bar.

3. The apparatus of claim 1, wherein each member and each structure are removably attachable to the cross bar.

4. The apparatus of claim 1, wherein the cross bar further comprises a plurality of side bars, the side bars adapted to connect to each other to form the cross bar.

5. The apparatus of claim 1, wherein each support leg has a bracket with a slot sized to receive an end of the cross bar, the support leg having a raised portion positioned at an end of the bracket to prevent cross bar travel.

6. In a storage compartment of a carrier, the storage compartment having a means for securing one or more recreational vehicles, the improvement comprising the tie down apparatus of claim 1 mounted in a trailer as the means for securing.

7. In a method of hauling one or more recreational vehicles using a carrier having a storage compartment for the one or more recreational vehicles, the improvement comprising securing the one or more recreational vehicles in the storage compartment using the tie down apparatus of claim 1.

8. A tie down apparatus for securing one or more recreational vehicles in a storage compartment of a carrier comprising:
 a) a cross bar;
 a pair of support legs, each support leg adapted to attach to the storage compartment; with a portion of each support leg adapted to support one end of the cross bar above a floor of the storage compartment;
 c) a plurality of pairs of members, each member being mounted to the cross bar and shaped to extend therefrom, the attachment of the pair of members to the cross bar creating a space to receive a portion of the recreational vehicle, and
 d) at least one eyelet associated with each pair of members, the at least one eyelet attached to the cross bar.

9. A tie down apparatus for securing one or more recreational vehicles in a storage compartment of a carrier comprising:
   a) a cross bar;
   b) a pair of support legs, each support leg adapted to attach to the storage compartment; with a portion of each support leg adapted to support one end of the cross bar above a floor of the storage compartment; and
   c) a means for securing at least a portion of the recreational vehicle to the cross bar, the means for securing mounted to the cross bar, wherein the means for securing includes means for restraining lateral movement of the portion of recreational vehicle and one or more structures associated with the cross bar to receive an elongate flexible member adapted to attach to the recreational vehicle, wherein the lateral securing means includes at least on pair of members mounted to the cross bar, the members creating a space to receive a portion of the recreational vehicle.

10. The apparatus of claim 9, wherein the cross bar further comprises a plurality of side bars, the side bars adapted to connect to each other to form the cross bar.

11. The apparatus of claim 9, wherein each support leg has a bracket with a slot sized to receive an end of the cross bar, the support leg having a raised portion positioned at an end of the bracket to prevent cross bar travel.

12. The apparatus of claim 9, wherein the means for securing is adjustable along the length of the cross bar.

13. The apparatus of claim 9, wherein the lateral securing means includes at least one u-shaped member mounted to the cross bar, the u-shape member creating a space to receive the portion of the recreational vehicle.

14. The apparatus of claim 9, wherein the one or more structures comprise one or more eyelets mounted to the cross bar.

* * * * *